Inventor:
John C. Corbin.
by Wilkinson + Giusta,
Attorneys.

UNITED STATES PATENT OFFICE.

JOHN CURRY CORBIN, OF NAPOLEONVILLE, LOUISIANA.

WINDROWING-MACHINE.

1,321,721. Specification of Letters Patent. Patented Nov. 11, 1919.

Application filed November 11, 1918. Serial No. 261,948.

*To all whom it may concern:*

Be it known that I, JOHN CURRY CORBIN, a citizen of the United States, residing at Napoleonville, in the parish of Assumption and State of Louisiana, have invented certain new and useful Improvements in Windrowing-Machines; and I do hereby declare the following to be a full, clear, and exact description of the invention, such as will enable others skilled in the art to which it appertains to make and use the same.

My invention relates to improvements in machines for wind-rowing sugar cane for the purpose of cutting the same either for use as seed cane, or to protect the same, as far as possible, against deterioration after it has been killed by frost.

The purpose of the invention is to cut a pair of adjacent rows of cane close to the ground and deposit the stalks, with the leaves and trash attached, into the furrow between said rows, thus forming what is known as a "wind-row."

Various machines have been devised for the purpose of not only cutting the cane near the ground, but of also stripping the trash from the stalks and cutting off the green tops, with the attached leaves, from the upper ends of the stalks; but such machines have been found difficult, if not impracticable, for use, for the reason that the stalks of the sugar cane are apt to be blown down and then to grow up in a crooked form, forming a tangled mass, the single stalks of which could not be stripped and topped, as far as I am aware, by any of the machines now known.

Furthermore, cane stalks are apt to be of a very uneven height, so that if the machine be set to cut off the tops for any given height, an excess of length of the longer stalks would be removed, while the shorter stalks would be left with a large part of the green portion and of the green leaves attached, so that the results from such cutting and topping machines have hitherto been very unsatisfactory.

According to my invention I do not attempt either to strip the stalks of the trash, or to cut off the tops with the green leaves attached thereto; but I merely design to cut the stalks close to the ground and deposit the same as smoothly as practicable from two adjacent rows into a single trench, thus accomplishing by machine work what has hitherto been largely effected by cane cutters using cane knives and operating by hand.

My invention will be more fully understood after reference to the accompanying drawings, in which similar parts are indicated by like reference symbols throughout the several views, and in which:—

Figure 3:
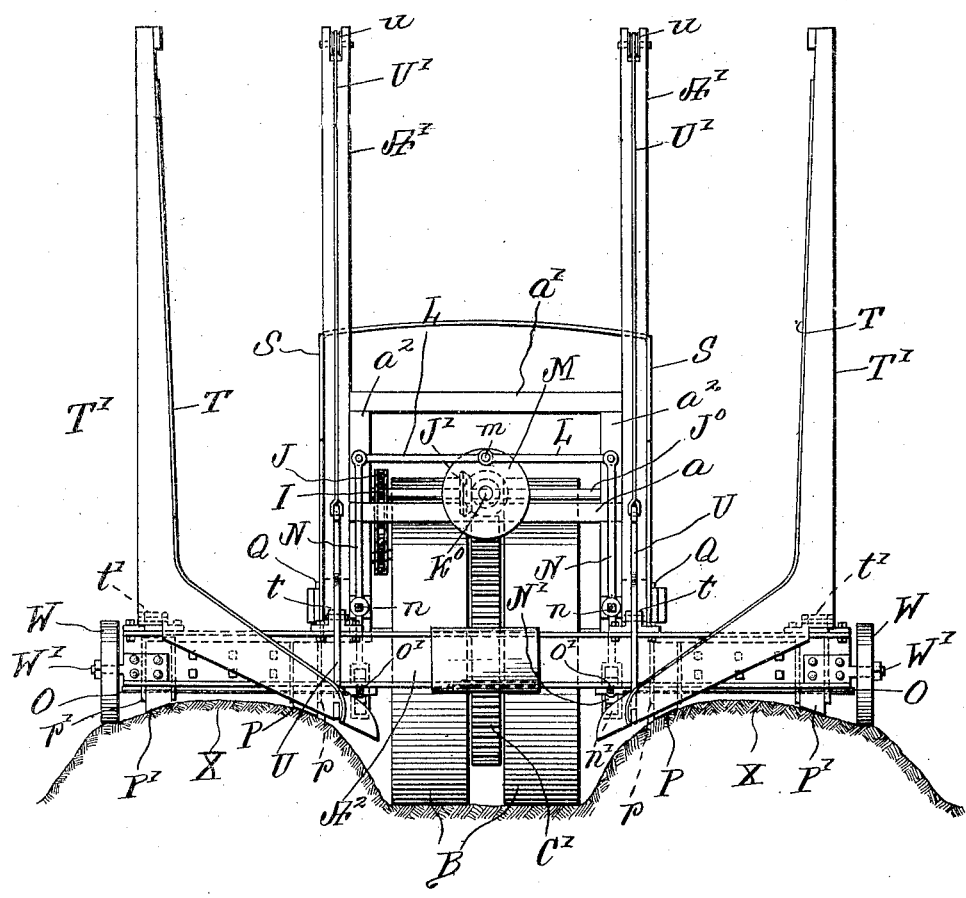
Fig. 3 is a rear view of the machine.

A represents the main frame of the machine supported upon the traction wheels B and the steering wheel D, which wheels are of narrow gage and adapted to travel in the trench between the adjacent rows, as shown in Fig. 3.

The traction wheels B are mounted on the axle C beneath the main frame; and the steering wheel D is journaled in the yoke D′ mounted beneath the turn-table $D^2$ and rotated by the sprocket chain $D^3$, engaging the sprocket pinion $D^4$, controlled by the hand wheel $D^5$.

E represents the driving engine which may be of any suitable or preferred type. I have shown this engine, diagrammatically in Figs. 1 and 2.

Power is communicated from this driving engine to the machine in any convenient way, as by means of the drive shaft E′ carrying the fly wheel $E^2$, which shaft carries the bevel pinion F meshing in the bevel pinion F′ carried by the shaft $F^0$, which shaft carries the sprocket gear $F^2$ meshing in the sprocket chain G which also drives the sprocket wheel H on the shaft H′; this shaft H′ carries the gear $H^2$ driving the spur wheel C′ fast on the main axle C. This shaft H′ also carries the sprocket wheel $H^3$ which drives the sprocket chain I and the sprocket wheel J on the shaft $J^0$.

Figure 5:
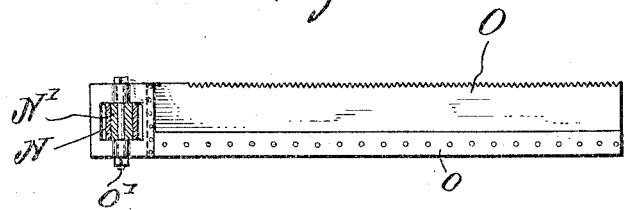
Fig. 5 shows a section along the line 5—5 of Fig. 4 and shows the saw in plan.

This shaft $J^0$ carries the bevel gear J′ meshing with the bevel gear K on the shaft K⁰ carrying the fly wheel M, to which the links L are eccentrically pivoted as at m. These links are connected to the levers N pivoted to the main framework at n and having their lower arms slotted as at n' to receive the sliding blocks N' to which the pivot pins o' of the saws O are connected. These saws consist of a flat sheet of metal dentated as shown in Fig. 5, and reinforced at the back with a strip o.

Figure 4:
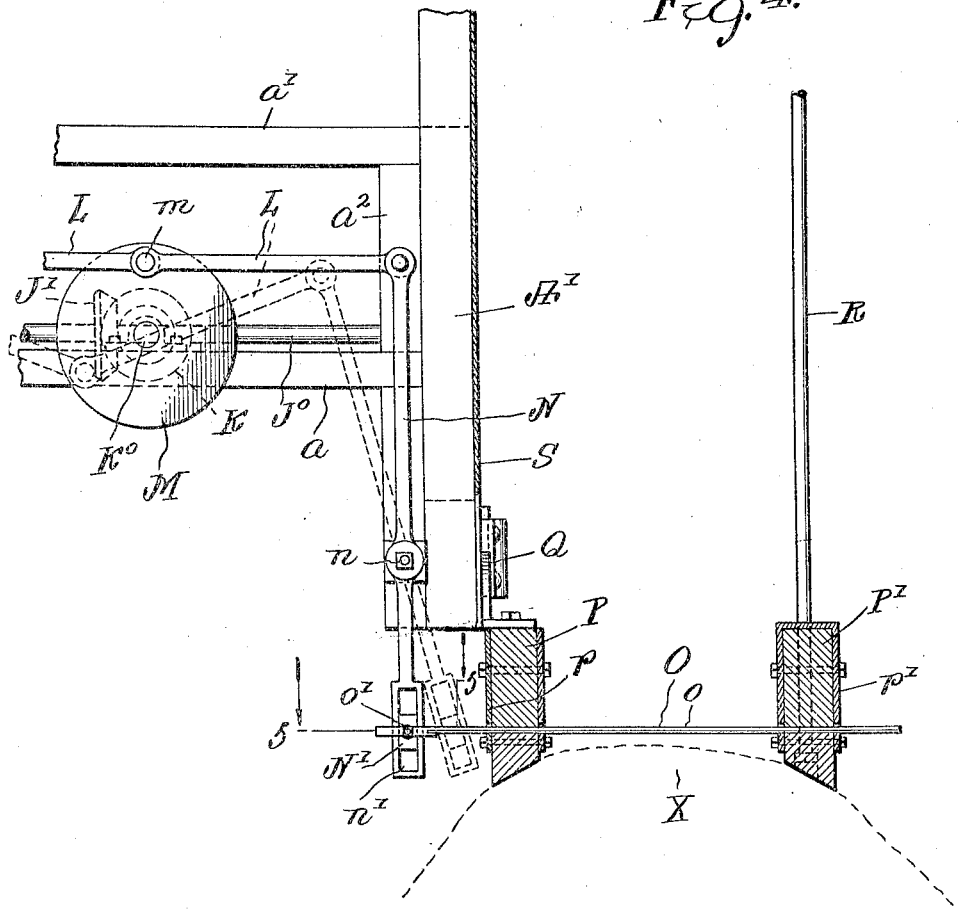
Fig. 4 is a sectional view, on a larger scale, showing a section along the broken line 4—4 of Fig. 2, and looking in the direction of the arrows.

It will be seen, as shown in Fig. 4, that the rotation of the fly wheel M will reciprocate these saws as indicated in full and dotted lines in said figure. These saws slide through bearings in the shoes P and P' which straddle the cane rows X, and these shoes are reinforced with side plates p and p', as shown most clearly in Fig. 4. These plates are connected to the main frame and to the transverse channel iron $A^2$ rigidly attached to said main frame by means of the bracket Q, or in any other convenient way.

Figure 1:
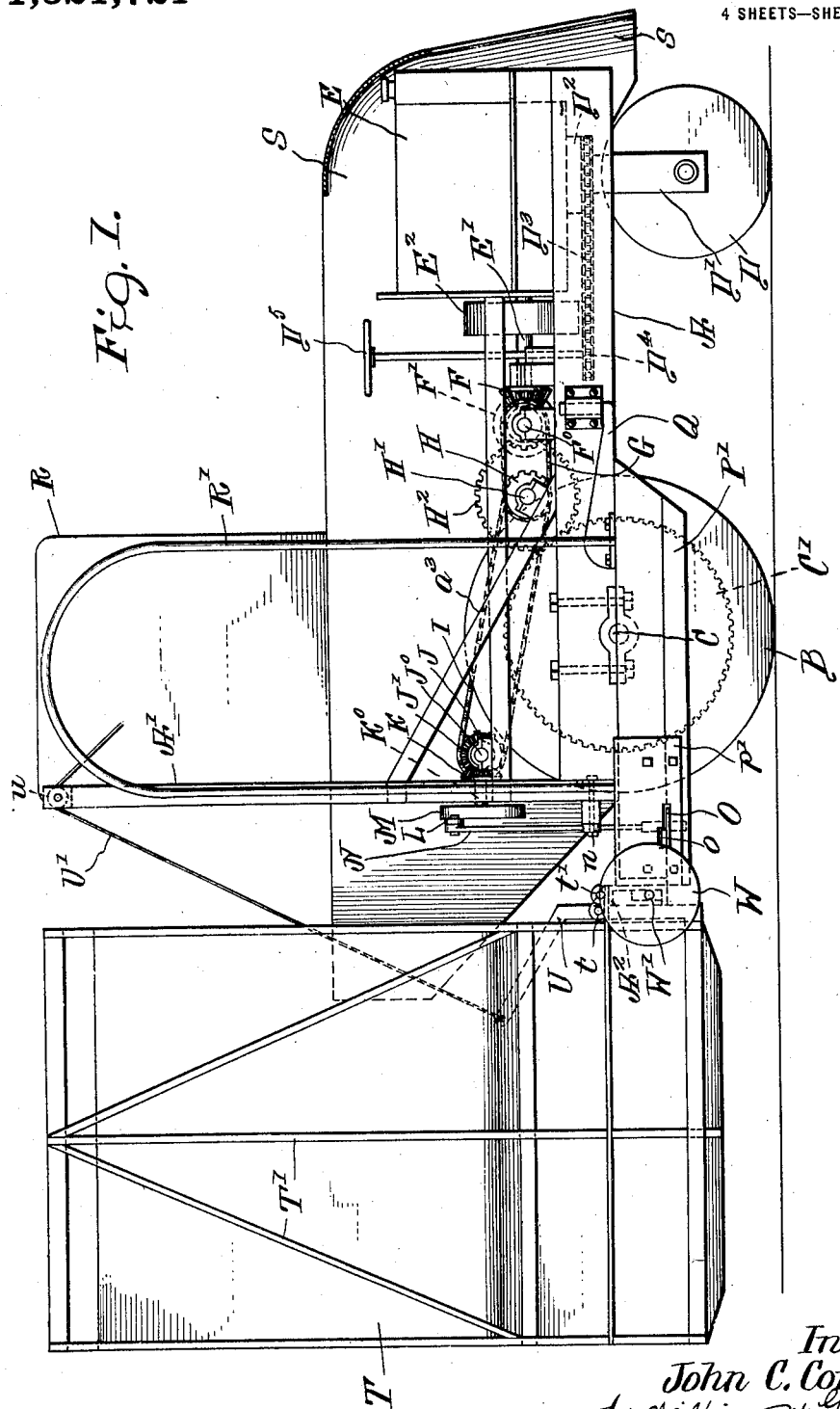
Figure 1 shows a side elevation of the complete machine, parts, such as the driver's seat, the hoisting drum, one of the front guards, and other attachments, being omitted for the sake of clearness in the drawings, parts being shown in section, and one of the side guards being removed.
Figure 2:
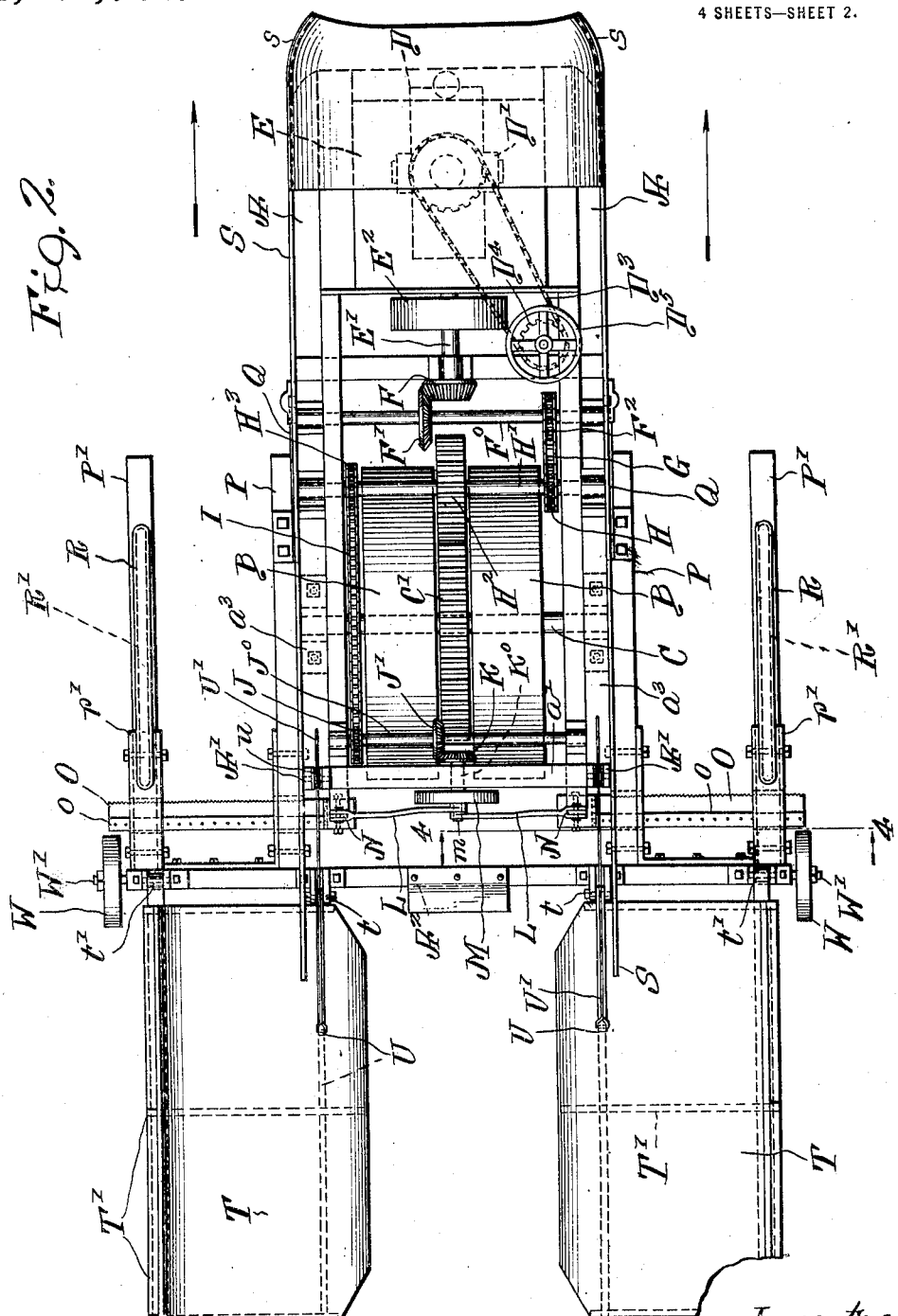
Fig. 2 is a plan view of the machine shown in Fig. 1.

R represents the outer guard for the cane stalks, mounted on its frame R', which is shown in the form of a rod bent to form an inverted U-shape loop, as shown most clearly in Fig. 1; and the inner guard for the stalks comprises a plate S bent inward at the front as at s, so as to tend to deflect the cane from the middle between the rows outward so that the cane stalks would be directed between the guards S and R and may be cut at the bottom by the saws, as will be hereinafter described.

In order to direct the cut stalks of cane from the two adjacent rows to the middle between the rows, I provide two rear guards T which are preferably made of sheet metal mounted on a suitable framework T', which framework is hinged to the channel beam $A^2$ by means of the hinges t and t'. These two rear guards may be tilted upward through a sufficient angle by means of the levers U and the lifting ropes or chain U' which pass over the pulleys u carried by the vertical posts A', which vertical posts are braced in any suitable way, as by means of the cross pieces a and a' and the vertical braces $a^2$ and the diagonal braces $a^3$.

In order to prevent the machine from tipping over too far in either direction, I provide spud wheels W mounted upon shafts W' carried by the channel beam $A^2$.

The operation of the device is as follows: The machine is driven forward in the direction of the arrows indicated in Fig. 2, with the drive wheels B in the furrow between the two adjacent rows of cane. The curved ends s will tend to press the stalks away from the center between the rows, and the guards R will tend to direct the stalks from the opposite side of the row into the throat where the saws are reciprocating.

The forward motion of the vehicle will cause the saws to reciprocate, and, as the machine advances, the saws will cut off the stalks near the level of the top of the row, and the tops of the stalks will fall backward against the rear guards T, which will direct the stalks into a single continuous heap in the furrow in rear of the machine as it advances, thus forming what is known as a wind-row.

The cane may be left in this fallen and piled up condition or, if desired, each edge may be covered by a layer of dirt thrown from a plow, or otherwise, thus in a large measure protecting the cane juice from fermentation owing to heat and atmospheric influences.

In order to turn the machine it may be desirable to tilt up the rear end of the rear guards T; this may be done by means of the ropes or chains U' and the levers U.

Any tendency of the machine to tilt unduly will be corrected by means of the wheels W and shoes P and P'.

It will be obvious that various modifications might be made in the herein described apparatus and in the construction, combination and arrangement of parts which could be used without departing from the spirit of my invention; and I do not mean to limit the invention to such details, except as particularly pointed out in the claims:

Having thus described my invention, what I claim and desire to secure by Letters Patent of the United States is:

1. A cane wind-rowing machine adapted to direct the cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame, said shoes being provided with guideways therein, inner front guards carried at each side of said main frame and inclined inwardly in front thereof, outer guards carried by the outer member of each pair of shoes, saws reciprocating in the guideways in said shoes, means operated by said engine for reciprocating said saws, and inclined rear guards for the cane stalks adapted to direct the cut stalks from both rows into a single continuous pile in the trench between adjacent cane rows, substantially as described.

2. A cane wind-rowing machine adapted to direct the cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame and inclined inwardly in front thereof, said shoes being provided with guideways therein, outer guards carried by the outer member of each pair of shoes, saws reciprocating in the guideways in said shoes, means operated by said engine for reciprocating said saws, and inclined rear guards for the cane stalks adapted to direct the cut stalks from both rows into a single continuous pile in the trench between adjacent cane rows, with means for tilting the rear ends of said rear guards upward, when desired, substantially as described.

3. A cane wind-rowing machine adapted to direct the cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame, said shoes being provided with guideways therein, inner front guards carried at each side of said main frame and inclined inwardly in front thereof, outer guards in the form of inverted U-shaped loops carried by the outer member of each pair of shoes, saws reciprocating in the guideways in said shoes, means operated by said engine for reciprocating said saws, and inclined rear guards for the cane stalks adapted to direct the cut stalks from both rows into a single continuous pile in the trench between adjacent cane rows, substantially as described.

4. A cane wind-rowing machine adapted to direct the cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame and inclined inwardly in front thereof, said shoes being provided with guideways therein, outer guards in the form of inverted U-shaped loops carried by the outer member of each pair of shoes, saws reciprocating in the guideways in said shoes, means operated by said engine for reciprocating said saws, and inclined rear guards for the cane stalks adapted to direct the cut stalks from both rows into a single continuous pile in the trench between adjacent cane rows, with means for tilting the rear ends of said rear guards upward, when desired, substantially as described.

5. A cane wind-rowing machine adapted to direct the cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame, said shoes being provided with guideways therein, inner front guards carried at each side of said main frame and inclined inwardly in front thereof, outer guards carried by the outer member of each pair of shoes, saws reciprocating in the guideways in said shoes, means operated by said engine for reciprocating said saws, spud wheels journaled on said frame outside of the outer shoes, and inclined rear guards for the cane stalks adapted to direct the cut stalks from both rows into a single continuous pile in the trench between adjacent cane rows, substantially as described.

6. A cane wind-rowing machine adapted to direct the cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame and inclined inwardly in front thereof, said shoes being provided with guideways therein, outer guards carried by the outer member of each pair of shoes, saws reciprocating in the guideways in said shoes, means operated by said engine for reciprocating said saws, spud wheels journaled on said frame outside of the outer shoes, and inclined rear guards for the cane stalks adapted to direct the cut stalks from both rows into a single continuous pile in the trench between adjacent cane rows, with means for tilting the rear ends of said rear guards upward, when desired, substantially as described.

7. A cane wind-rowing machine adapted to direct the cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame, said shoes being provided with guideways therein, inner front guards carried at each side of said main frame and inclined inwardly in front thereof, outer guards in the form of inverted U-shaped loops carried by the outer member of each pair of shoes, saws reciprocating in the guideways in said shoes, means operated by said engine for reciprocating said saws, spud wheels journaled on said frame outside of the outer shoes, and inclined rear guards for the cane stalks adapted to direct the cut stalks from both rows into a single continuous pile in the trench between adjacent cane rows, substantially as described.

8. A cane wind-rowing machine adapted to direct the cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame and inclined inwardly in front thereof, said shoes being provided with guideways therein, outer guards in the form of inverted U-shaped loops carried by the outer member of each pair of shoes, saws reciprocating in the guideways in said shoes, means operated by said engine for reciprocating said saws, spud wheels journaled on said frame outside of the outer shoes, and inclined rear guards for the cane stalks adapted to direct the cut stalks from both rows into a single continuous pile in the trench between adjacent cane rows, with means for tilting the rear ends of said rear guards upward, when desired, substantially as described.

9. A cane wind-rowing machine adapted to direct cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame, said shoes being provided with guideways therein, inner front guards carried at each side of said main frame and inclined inwardly thereof, outer guards in the form of inverted U-shaped loops carried by the outer member of each pair of shoes, saws reciprocating in the guideways in said shoes, and means operated by said engine for reciprocating said saws, substantially as described.

10. A cane wind-rowing machine adapted to direct the cut stalks from two rows of cane into a single trench or furrow, comprising a main frame and an engine carried thereby, narrow gage wheels supporting said frame and adapted to pass in the trench between adjacent rows of cane, pairs of shoes mounted, respectively, at each side of said main frame and inclined inwardly in front thereof, said shoes being provided with guideways therein, outer guards in the form of inverted U-shaped loops carried by the outer member of each pair of shoes, saws reciprocating in the guideways in said shoes, means operated by said engine for reciprocating said saws, and means for directing the cane stalks into a single continuous pile in the trench between adjacent cane rows, when desired, substantially as described.

JOHN CURRY CORBIN.

Copies of this patent may be obtained for five cents each, by addressing the "Commissioner of Patents. Washington, D. C."